April 7, 1942.   A. MADARAS   2,278,456

HAIR CURLER ROD

Filed June 10, 1941

Inventor
Andrew Madaras

Patented Apr. 7, 1942

2,278,456

UNITED STATES PATENT OFFICE 2,278,456

HAIR CURLER ROD

Andrew Madaras, Chicago, Ill.

Application June 10, 1941, Serial No. 397,365

5 Claims. (Cl. 132—33)

This invention relates to hair curlers, and more particularly to a curler rod.

One of the objects of the invention is to provide a tubular rod and means for holding a clutch within said rod.

Another object is to provide a tubular body in which a bushing is mounted at one end which receives a clutch therein, and means for holding the clutch against removal formed on the said end.

With these and other objects in view, the invention will be better understood by reference to the following specification and accompanying drawing wherein like numerals represent corresponding parts and:

Figure 1:
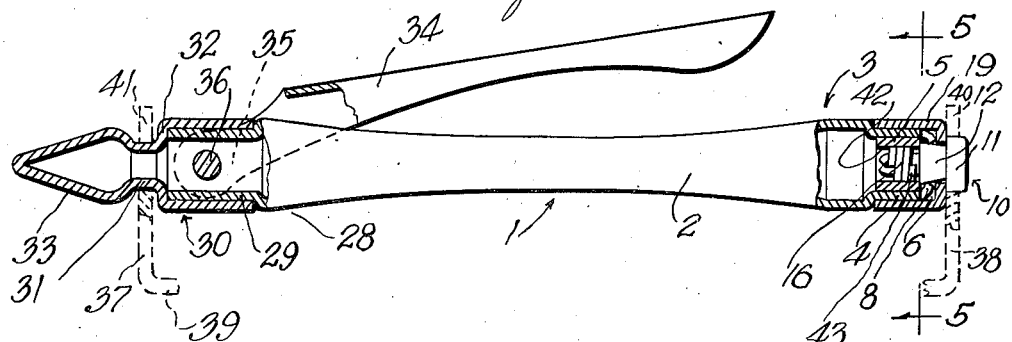
Fig. 1 is a side elevational view of the curler rod with parts broken away and shown in section.

Referring more particularly to the drawing 1 indicates a curler rod having a concavo-convex tubular intermediate body portion 2. One end 3 is provided with a reduced extension 4. Arranged in the extension 4 is a bushing 5 provided with a shoulder 6 in engagement with the outer end 7 of the extension 4.

The end 7 is provided with opposed inwardly curved tongues 8 arranged in a transverse slot 9 in the shoulder 6.

A clutch 10 is provided with a rectangular head 11. Extending inwardly from the head 11 is an outwardly tapered portion 12 the outer end of which is of a diameter slightly smaller than the width of the slot 9, from which extends a stub shaft 13 having a slot 14 in the end 15 thereof. The tongues 8 are so curved inwardly as to clear the outermost portion of the tapered portion 12. A coil spring 16 is mounted on the shaft 13 with one end 17 arranged in the slot 14 and locked in position by pressing the spaced portions 18 of the end 15 together as clearly shown in Fig. 4.

A cap 19 is provided with an opening 20 in the end 21 thereof. The cap is arranged on the clutch 10 with the outer face 22 of the end 21 in abutment with the inner face 23 of the head 11.

Figure 4:
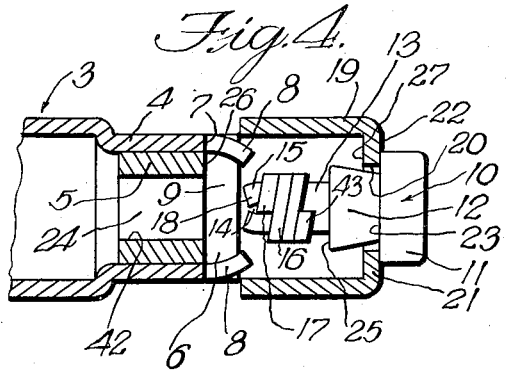
Fig. 4 is an enlarged sectional view of the clutch end before assembly of the clutch and cap to the body.

The cap 19 and clutch 10 are attached to the body 1 as follows:

The spring 16 and shaft 13 are pressed into an opening 24 formed in the bushing 5, with the tapered portion 12 arranged in the slot 9. The cap 19 is mounted on the clutch 10 as shown in Fig. 4. The clutch 10 is moved inward, the shaft 13 and spring 16 being arranged in the opening 24. Further inward movement brings the inner face 25 of the tapered portion 12 in engagement with the base 26 of the slot 6. Simultaneously the cap 19 rides over the extension 4, the face 27 engaging the tongues 8 and pressing them against the intermediate portion of the tapered portion 12 whereby to prevent removal of the clutch 10. The other end 28 of the body is provided with a reduced extension 29. A cap 30 is mounted on the extension 29. A reduced annular portion 31 is formed at the outer end 32 of the cap 30 having a substantially arrow-head handle 33 extending therefrom.

A latch 34 is provided with spaced perforated ears 35 which are pivotally attached to the cap 30 and extension 29 by means of a transverse rivet 36.

Figure 2:
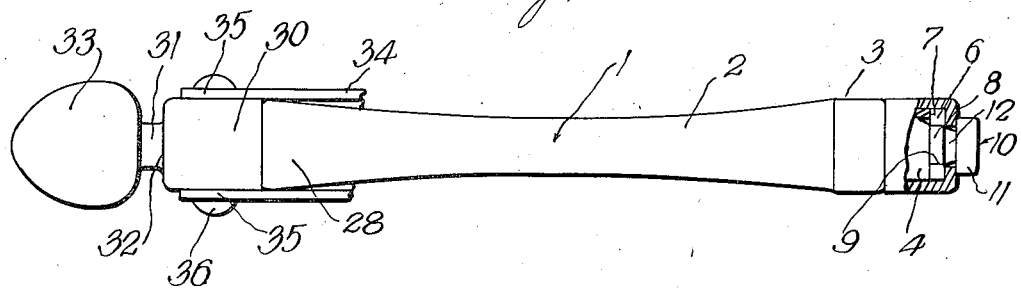
Fig. 2 is an elevational view looking from the bottom with parts broken away and shown in section.
Figure 3:
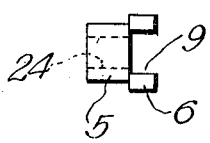
Fig. 3 is a detail view of the bushing.
Figure 5:
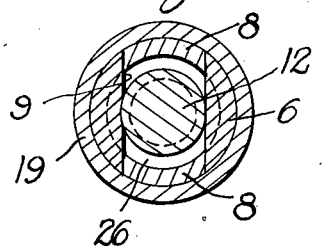
Fig. 5 is an enlarged section taken on the line 5—5 of Fig. 1.

The latch 34 is used to clamp a batch of hair which is usually arranged on the rod 1. The ears 35 straddle the outer periphery of the extension 29, as clearly shown in Fig. 2. The ends of the rivet are so headed as to allow for free pivotal movement of the latch 34.

The curler rod 1 is mounted in the fork members 37 and 38 respectively of the usual supporting arm 39. The rectangular portion 11 is held against movement in the slot 40. The annular portion 31 is rotatably mounted in the slot 41.

From the construction above described it will be seen that the curler rod 1 and bushing 5 may be turned by the handle 33 in one direction, the clutch 10 remaining stationary. Movement in the other direction of the rod 1 is prevented by the periphery 24 of the opening 24 in the bushing 5 acting to force the free end 43 of the spring 16 outwardly and locking the bushing 5 and spring 16 together.

Having thus described my invention, what I claim is:

1. A curler rod comprising a tubular body, a reduced annular extension formed on one end of said body, a slotted bushing mounted in said extension, a clutch mounted in said bushing, the tongues projecting from said extension into the slot in said bushing whereby to lock said bushing against movement relative to said body.

2. A curler rod comprising a tubular body, a reduced extension formed on one end of said body, a bushing mounted in said extension, a slotted head formed on said bushing in engagement with the outer end of said extension, opposed tongues projecting outwardly from said extension in the slot of said head, a clutch mounted in said bushing, and a closure for said extension.

3. A curler rod comprising a tubular body, a bushing mounted in one end of said body, a slotted head formed on said bushing in engagement with the outer end of said extension, a clutch mounted in said bushing, and tongues projecting outward from said extension in the slot in said head adapted to lock said clutch against outward movement.

4. A curler rod comprising a tubular body, a bushing mounted in one end of said body, a slotted head formed on said bushing in engagement with the outer edge of said end, a clutch mounted in said bushing, a tapered intermediate portion formed on said clutch, and tongues curved inwardly from said edge through the slot of said head in engagement with said tapered portion whereby to prevent outward movement of said clutch.

5. A curler rod comprising a tubular body, a bushing mounted in one end of said body, a slotted head formed on said bushing in engagement with the outer edge of said end, a clutch mounted in said bushing, a tapered intermediate portion formed on said clutch, curved tongues extending from said edge through the slot in said head, and a cap mounted on said clutch adapted to be mounted on said end whereby to press said tongues in abutment with said tapered portion.

ANDREW MADARAS.